(12) United States Patent
Ress, Jr.

(10) Patent No.: US 7,225,624 B2
(45) Date of Patent: Jun. 5, 2007

(54) METHOD AND APPARATUS FOR INCREASING THE PRESSURE OF COOLING FLUID WITHIN A GAS TURBINE ENGINE

(75) Inventor: Robert Anthony Ress, Jr., Carmel, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 287 days.

(21) Appl. No.: 10/863,902

(22) Filed: Jun. 8, 2004

(65) Prior Publication Data

US 2005/0268619 A1    Dec. 8, 2005

(51) Int. Cl.
   *F02C 6/08*    (2006.01)
(52) U.S. Cl. .......................... 60/782; 60/806
(58) Field of Classification Search ............... 60/782, 60/785, 806; 415/115, 116, 117
   See application file for complete search history.

(56) References Cited

U.S. PATENT DOCUMENTS

| | | | |
|---|---|---|---|
| 3,663,118 A * | 5/1972 | Johnson ................ | 415/116 |
| 4,901,520 A * | 2/1990 | Kozak et al. ............ | 415/116 |
| 5,185,997 A | 2/1993 | Nishijima | |
| 5,392,614 A | 2/1995 | Coffinberry | |
| 5,555,721 A | 9/1996 | Bourneuf et al. | |
| 5,581,996 A * | 12/1996 | Koch et al. ............. | 60/785 |
| 5,603,606 A | 2/1997 | Glezer et al. | |
| 5,724,806 A | 3/1998 | Horner | |
| 5,755,556 A | 5/1998 | Hultgren et al. | |
| 6,065,282 A | 5/2000 | Fukue et al. | |
| 6,089,010 A * | 7/2000 | Gross .................... | 60/785 |
| 6,185,925 B1 | 2/2001 | Proctor et al. | |
| 6,385,958 B2 | 5/2002 | Leone et al. | |
| 6,393,825 B1 | 5/2002 | Leone et al. | |
| 6,393,826 B1 | 5/2002 | Yamanaka et al. | |
| 6,460,343 B1 | 10/2002 | Rakhmailov | |
| 6,481,212 B2 | 11/2002 | Priestley | |
| 6,530,229 B2 | 3/2003 | Yamanaka et al. | |
| 6,532,744 B1 | 3/2003 | Reiter et al. | |

* cited by examiner

*Primary Examiner*—L. J. Casaregola
(74) *Attorney, Agent, or Firm*—Krieg DeVault, LLP

(57) ABSTRACT

A system located with the housing of a gas turbine engine for increasing the pressure of working fluid from the compressor that will be utilized to cool a component. In one form the system includes a pump rotatable with a turbine component to increase the pressure of the working fluid.

18 Claims, 5 Drawing Sheets

METHOD AND APPARATUS FOR INCREASING THE PRESSURE OF COOLING FLUID WITHIN A GAS TURBINE ENGINE

BACKGROUND

The present invention relates generally to methods and apparatus for increasing the pressure of cooling fluid utilized within a gas turbine engine. More particularly, one embodiment of the present invention relates to an internal pump coupled to a turbine disk for pressurizing compressor discharge working fluid to be utilized in cooling the combustor discharge nozzle.

A common technique for cooling gas turbine engine components, such as the combustor discharge nozzle, is to utilize a portion of the air from the compressor as a cooling fluid. In many systems, compressor discharge air flows from the compressor through the diffuser, bypasses the combustor liner, and is delivered to the combustor discharge nozzle. The cooling fluid flows within an internal passageway within nozzle components to remove heat through convective heat transfer.

Engineers and scientists continue to develop many engine designs to meet the demands of modern propulsion systems. In some designs, there is a significant reduction in the combustion system pressure loss. This minimization of combustion system pressure loss can make it challenging to maintain an adequate pressure differential at the combustor discharge nozzle to allow the needed flow to cool the components. Further, in some engine designs, there is a drastic increase in the temperature of the compressor discharge air due to higher-pressure ratios and/or the operation of the aircraft at higher air speed. It is recognized that passing it through a heat exchanger can reduce the temperature of the compressor discharge air. Each of these designs is generally limited by the ability to supply cooling fluid having the pressure necessary to be driven through the cooling circuit and to eliminate the occurrence of backflow.

The present application meets the need for increasing the pressure of cooling fluid utilized within a gas turbine engine in a novel and non-obvious way.

SUMMARY

One form of the present invention contemplates a gas turbine engine, comprising: a compressor operable to increase the pressure of a working fluid; a combustor in flow communication with at least a portion of the working fluid from the compressor, the combustor discharging a hot exhaust gas flow therefrom; a turbine including a rotatable structure with a plurality of turbine blades disposed in flow communication with the hot exhaust gas flow from the combustor; a mechanical housing surrounding at least a portion of the gas turbine engine; and, a pump located within the mechanical housing to increase the pressure of a flow of component cooling working fluid from the compressor, the pump having an inlet in flow communication with the flow of component cooling working fluid from the compressor and an outlet in fluid flow communication with an engine component to be cooled, the pump rotates with the rotatable structure to increase the pressure of the component cooling working fluid passed through the outlet.

Another form of the present invention contemplates an apparatus comprising: a gas turbine engine having a compressor portion operable to compress a working fluid, a combustor portion in flow communication with the compressor, and a turbine portion including a rotatable turbine structure in flow communication with the combustor portion, a first portion of the working fluid being flowed from the compressor portion to cool an engine component; and a pump connected to and rotatable with the turbine structure to pressurize the first portion of working fluid flowed from the compressor portion to cool the engine component.

In yet another form of the present invention there is contemplated a system for cooling a gas turbine engine comprising: a compressor for pressurizing a working fluid within the gas turbine engine; a rotatable turbine structure including a fluid pressurizer having a fluid intake and a fluid output, the fluid pressurizer is rotatable with the turbine structure; a fluid pathway extending between the compressor and the fluid intake for the passage of working fluid; wherein the fluid pressurizer upon rotation with the turbine structure is effective to increase the pressure of the working fluid passed through the fluid output relative to the pressure of the fluid passed through the fluid intake.

In yet another form of the present invention there is contemplated a method comprising: compressing a working fluid within a gas turbine engine compressor; flowing a portion of the working fluid from the compressor to a rotatable turbine component including a pump; rotating the pump to increase the pressure of the working fluid from the flowing; and flowing the working fluid from the pump to an engine component to be cooled.

One object of the present invention is to provide a unique system to increase the pressure of cooling fluid within a gas turbine engine.

Related objects and advantages of the present invention will be apparent from the following description.

DETAILED DESCRIPTION OF ILLUSTRATED EMBODIMENTS

Figure 1:
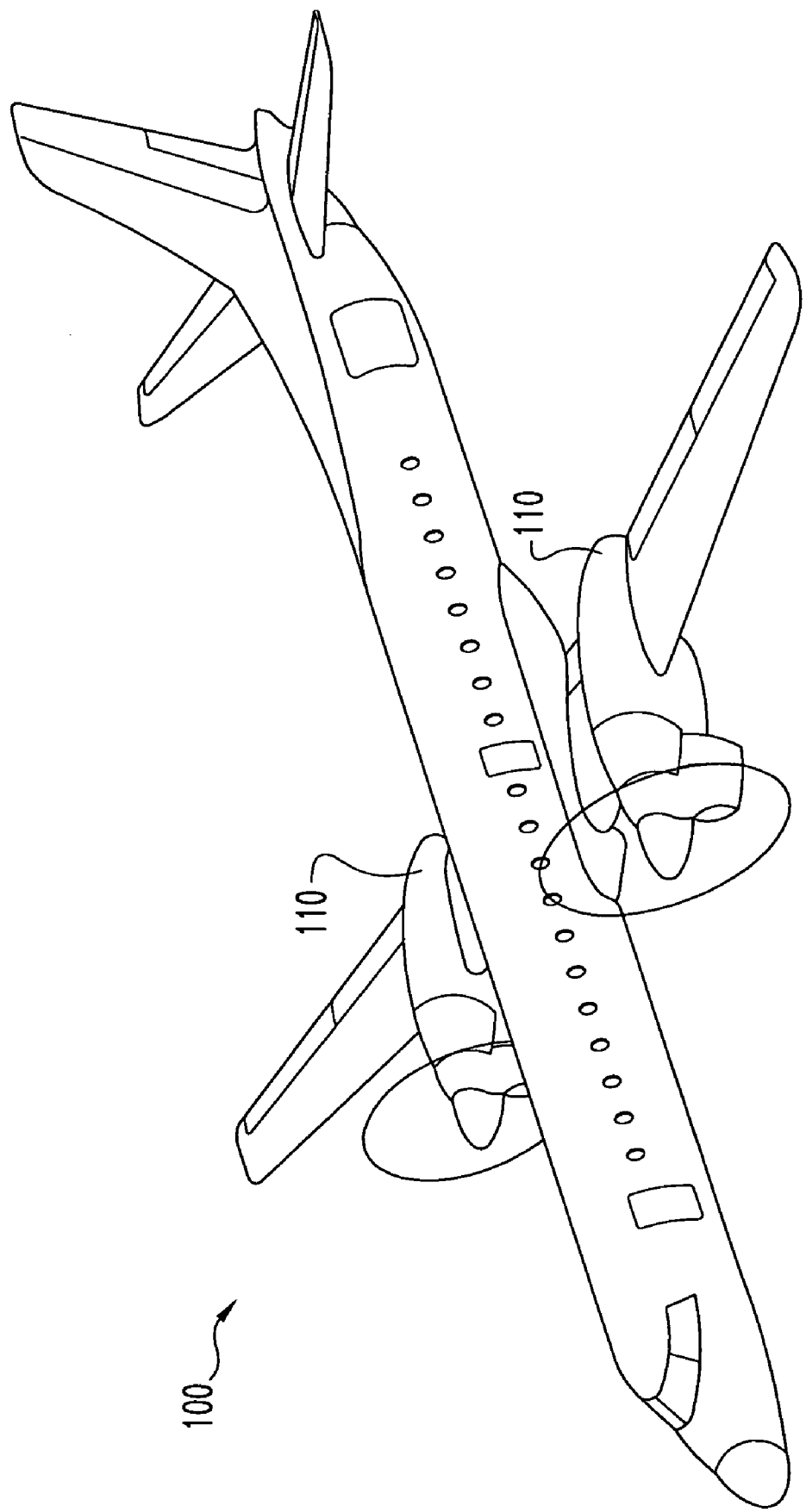
FIG. 1 is an illustration of an aircraft.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would occur to one skilled in the art to which the invention relates.

Referring to FIG. 1, there is shown an aircraft 100 which includes gas turbine engines 110. Engines 110 operate to propel aircraft 100 during flight. Aircraft 100 is only exemplary and the term aircraft is generic and includes helicopters, airplanes, missiles, unmanned space devices and any other similar devices.

Figure 2:
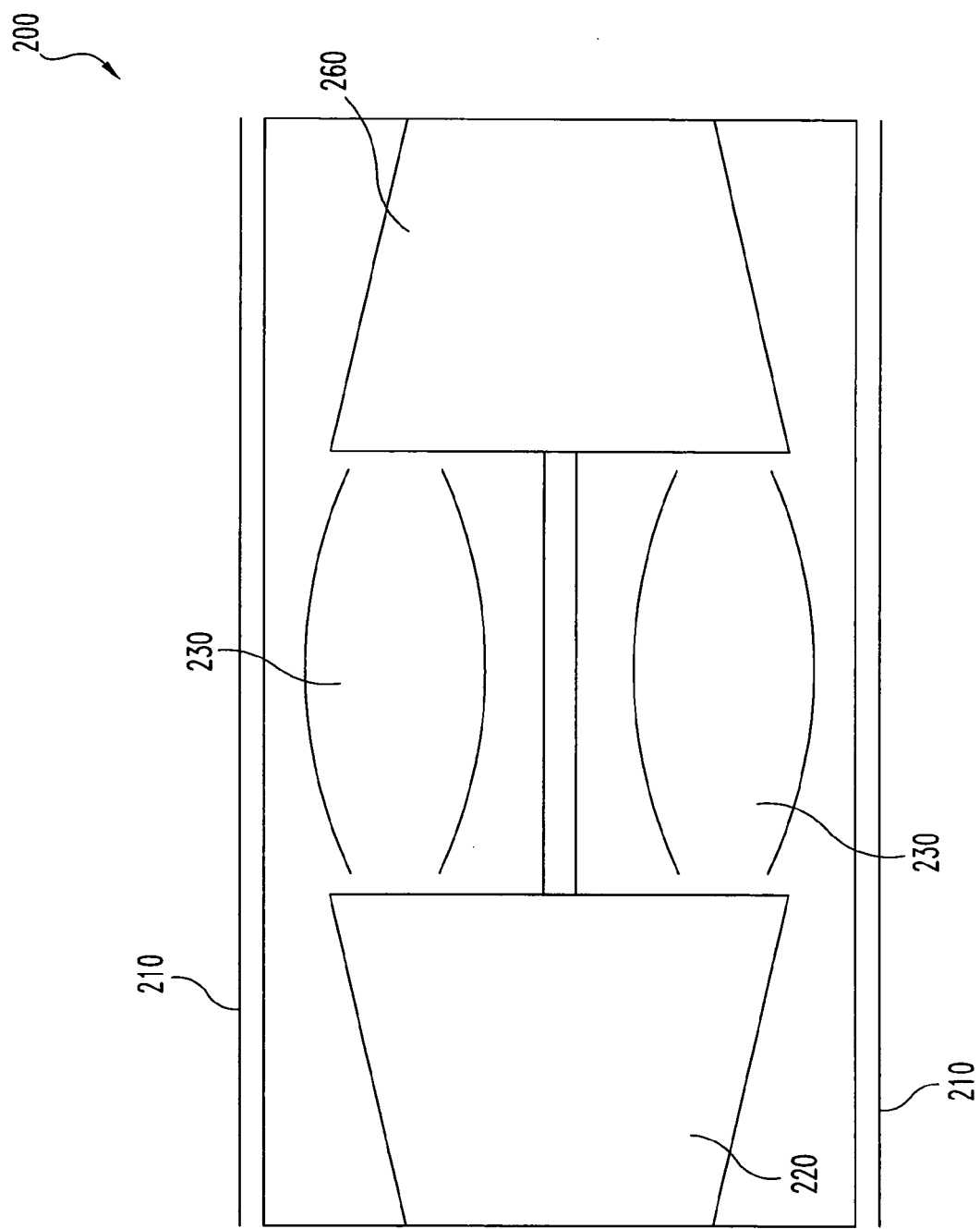
FIG. 2 is a schematic illustration of a gas turbine engine.

Referring to FIG. 2, there is illustrated a schematic representation of a gas turbine engine 200 which includes compressor section 220, combustor section 230, and turbine section 260 that are integrated together to produce an aircraft flight propulsion engine. Engine 200 also includes a mechanical housing 210 that houses compressor section 220, combustor section 230, and turbine section 260. The mechanical housing may be separate components joined together or one component. One alternate form of a gas turbine engine includes a compressor, a combustor, a fan section, and a turbine that have been integrated together to produce an aircraft flight propulsion engine, which is generally referred to as a turbo-fan. It is important to realize that there are multitudes of ways in which the gas turbine engine components can be linked together. Additional compressors and turbines could be added with intercoolers connecting between the compressors and reheat combustion chambers could be added between the turbines.

A gas turbine engine is equally suited to be used for industrial applications. Historically, there has been widespread application of industrial gas turbine engines, such as pumping sets for gas and oil transmission lines, electricity generation, and naval propulsion.

With continued reference to FIG. 2, compressor section 220 includes a rotor having a plurality of compressor blades coupled thereto. The rotor is affixed to a shaft that is rotatable within the gas turbine engine 200. A plurality of compressor vanes are positioned within the compressor section 220 to direct the fluid flow relative to the compressor blades. Turbine section 260 includes a plurality of turbine blades that are coupled to a rotor disk. The rotor disk is affixed to a shaft, which is rotatable within the gas turbine engine 200. Energy extracted in the turbine section 260 from the hot gas exiting the combustor section 230 is transmitted through the shaft to drive the compressor section 220. Further, the turbine section 260 provides power to an output shaft, which is utilized to drive a propulsion device, such as a fan or propeller in an aircraft. Further details related to the principles and components of a conventional gas turbine engine will not be described herein as they are believed known to one of ordinary skill in the art.

Figure 3:
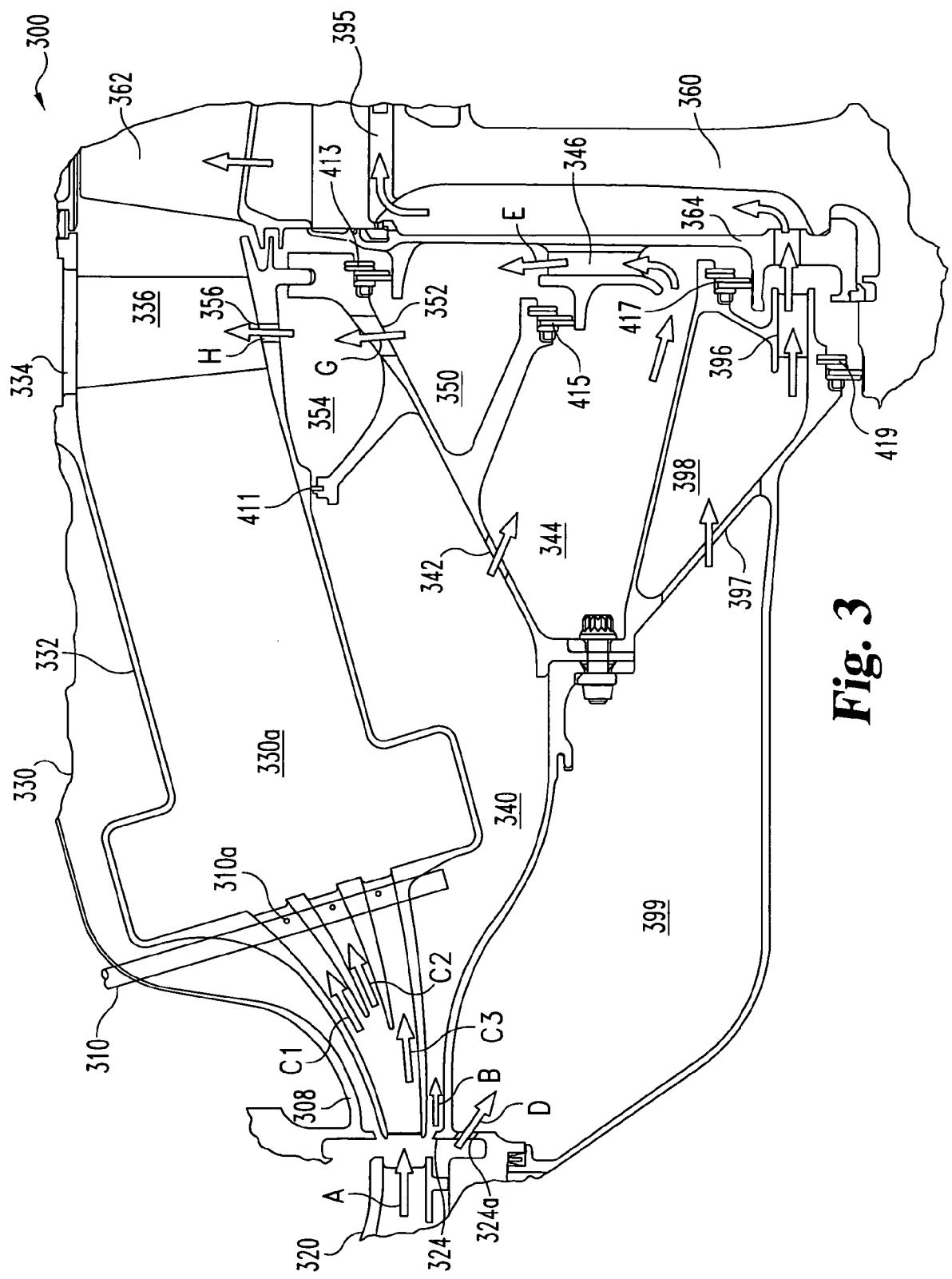
FIG. 3 is a partial cross-section of a gas turbine engine including one embodiment of the present invention.

With reference to FIG. 3, there is illustrated a portion of a gas turbine engine 300. During operation of the engine, working fluid compressed by the compressor flows through compressor discharge 320 generally in the direction indicated by arrow A. The working fluid is preferably air; however, other fluids are contemplated herein. After passing through compressor discharge 320 a portion of the compressed fluid passes through diffuser 308 generally in the directions indicated by arrows C1, C2, and C3. This compressed fluid is mixed with fuel introduced via fuel line 310. The fuel being discharged through fueling apparatus 310a into the working fluid stream flowing to the combustor 330. Compressed fluid and fuel then enters the interior volume 330a of the combustor 330, which is defined by the combustor liner 332. In the combustor 330, fuel and air are ignited to release energy and create a hot exhaust gas flow. The products of combustion are then discharged from combustor 330 and pass through the combustor discharge nozzle 334 at extremely high temperature.

After passing through compressor discharge 320, another portion of the compressed working fluid flows through opening 324 generally in the direction indicated by arrow B. This portion of the working fluid flows through chamber 340 to opening 342 and into chamber 344. The present invention contemplates that there are a plurality of openings 342 spaced around the circumference of the engine.

The working fluid in chamber 344 is drawn into pump 346 wherein its pressure is raised by the work performed by the pump. The increased pressure working fluid exits pump 346 and passes into chamber 350, as generally indicated by the arrow E. From chamber 350 the working fluid flows through opening 352 into chamber 354 as generally indicated by arrow G. From chamber 354 fluid flows through opening 356 into combustor discharge nozzle 334, as generally indicated by arrow H. At this point the fluid may cool an engine component, for example, vane 336 which is disposed within nozzle 334. This may be accomplished by opening 356 allowing fluid to flow into vane 336 and through vane 336 to the surrounding environment of nozzle 334. The vanes contemplated herein may include an internal cooling flow path and external fluid discharge apertures for allowing surface film cooling. The present invention contemplates that there are a plurality of openings 352 and 356 spaced around the circumference of the engine.

Pump 346 is located with and driven by the turbine section of the engine. In one form of the present invention, pump 346 is coupled to and rotates with the turbine disk 360. In another form of the present invention, the pump 346 is coupled to and rotates with a mini disk 364. In a preferred form of the present invention, the pump 346 is formed as a unitary structure with the mini disk 364. Pumps contemplated herein include, but are not limited to, shrouded, unshrouded, inpeller, vane, scroll. The mini disk 364 is connected to turbine disk 360 and rotates therewith. The turbine disk 360 has a plurality of turbine blades 362 disposed around its circumference. The hot exhaust gas discharged from the combustor flows through the combustor nozzle 334 and impinges upon the plurality of turbine blades 362, thereby causing rotation of the turbine disk 360, mini disk 364, and pump 346. This rotation drives pump 346 which increases the pressure of the working fluid passing from chamber 344 into chamber 350. In one form of the present invention, the increase in pressure corresponds to an approximate pressure ratio of 1.05. However, the present invention contemplates other pressure ratios.

A portion of the compressor discharge working fluid passes through an opening 324a into chamber 399 and flows through opening 397 into chamber 398. The portion of the compressor discharge working fluid passes through a static preswirl nozzle 396 and through the mini disk 364 and flows into a cooling fluid inlet 395 within the turbine disk 360. The working fluid flowing in a flow passageway between the disk 364 and the turbine rotor 360. The portion of the compressor discharge working fluid passes from the cooling fluid inlet into the blades 362 to provide convective heat transfer. The present invention contemplates that there are a plurality of openings 324a and 397 spaced around the circumference of the engine.

With continued referenced to FIG. 3, there is illustrated a plurality of seals to minimize fluid leakage between areas within the engine. The embodiment of FIG. 3 includes seals 411, 413, 415, 417 and 419 which may be of the brush or labrynith type at the rotating to static interfaces and of the brush, finger, piston ring, c-seal or w-seal type at the static to static interfaces. In the embodiment of FIG. 3, seal 411 is a static to static interface, while seals 413, 415, 417 and 419 are static to rotating interfaces.

Figure 4:
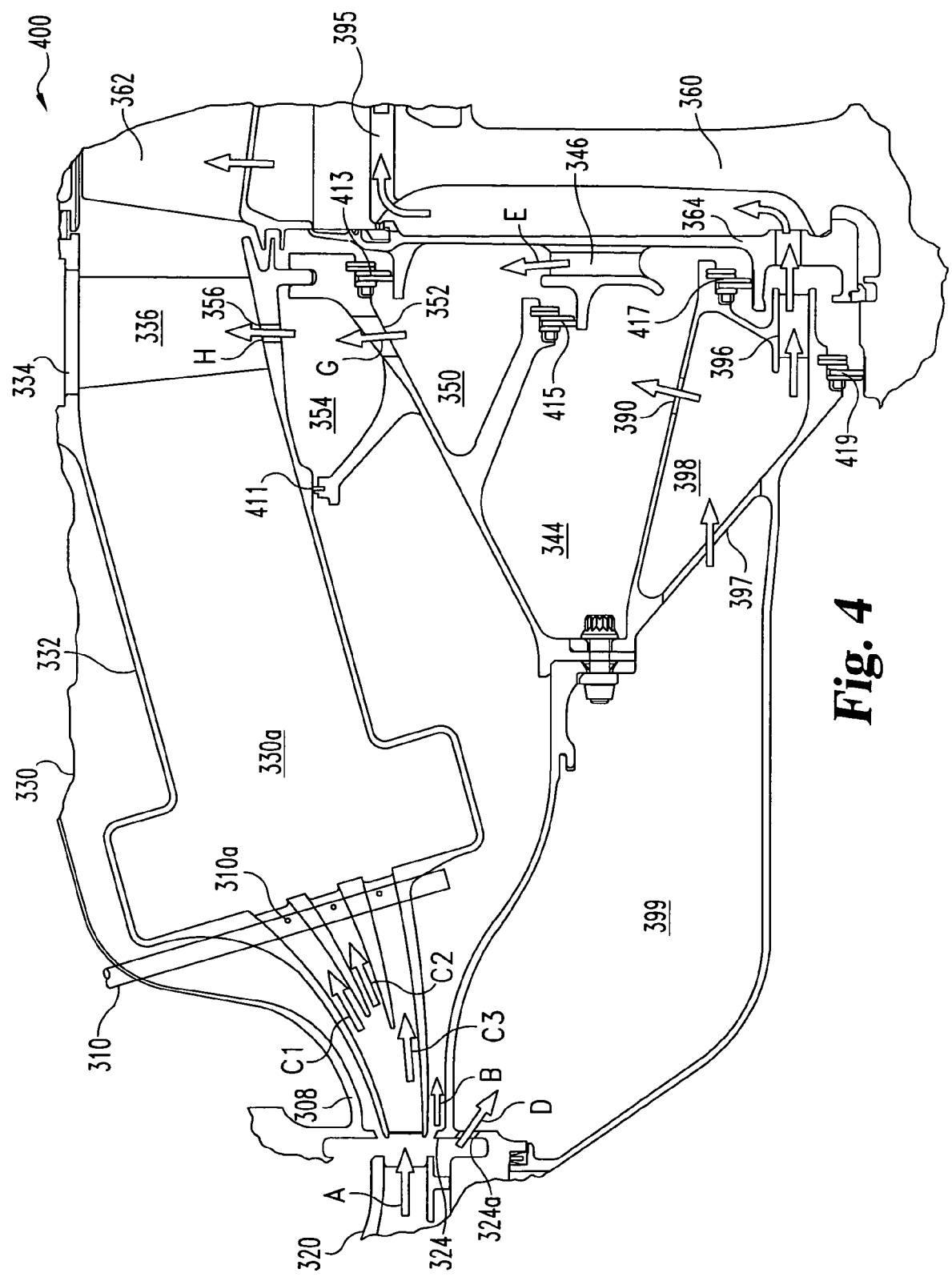
FIG. 4 is a partial cross-section of a gas turbine engine, including one embodiment of the present invention.

With reference to FIG. 4, there is shown an enlarged view of a portion of a gas turbine engine 400. The gas turbine engine 400 is similar to gas turbine engine 300 and like feature numbers will be utilized to represent like features. A portion of the compressor discharge working fluid indicated by arrow 'D' passes through opening 324a into the chamber 399. From chamber 399 the compressor discharge working fluid flows through opening 397 into chamber 398. Within chamber 398 the working fluid exits through opening 390 into chamber 344 to pump 346 and through the static preswirl nozzle 396 to the plurality of blades 362. This alternative embodiment splits the working fluid flow within chamber 398 into a pump portion and a static preswirl nozzle portion.

Figure 5:
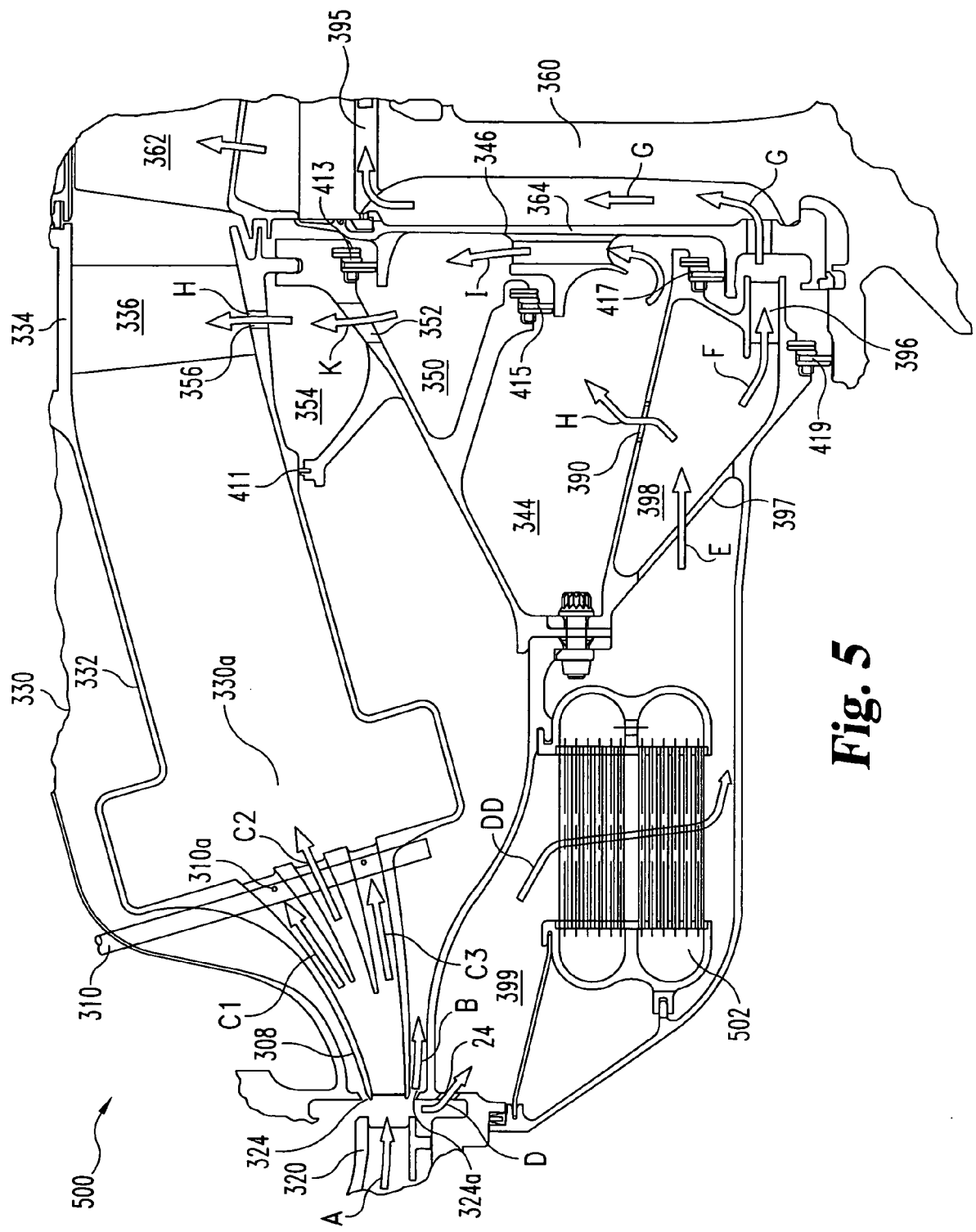
FIG. 5 is a partial cross-section of a gas turbine engine, including one embodiment of the present invention.

With reference to FIG. 5, there is shown a portion of a gas turbine engine 500 which is similar to, but differs from, those shown in FIGS. 3 and 4. The utilization of like feature numbers will indicate like features. During operation of the engine, the pump 346 raises the temperature of the working fluid that it pressurizes. In one form, the increase in temperature of the working fluid passing through the pump can be in range of about 50° F. to about 100° F. depending on the efficiency of the pump. In cases where the increase in cooling fluid temperature is unacceptable, or in cases where it is desirable to supply the combustor discharge nozzle with pressurized working fluid at a lower temperature, a heat exchanger can be utilized to cool the compressor discharge working fluid prior to going to the pump 346.

Compressed working fluid flows from the compressor discharge 320 generally in the direction shown by arrow A. Upon passing out of the compressor discharge 320, the working compressed fluid encounters diffuser 308. A portion of the compressed fluid flows through diffuser 308 generally in the directions indicated by arrows C1, C2 and C3. Fuel is introduced to the compressed fluid at the combustor 330 via fuel discharge aperture 310a in fuel line 310. The compressed fluid and fuel is ignited within the combustor.

Another portion of the compressed working fluid exiting compressor discharge 320 flows through opening 324a generally in the direction indicated by arrow D. From opening 324a this portion of fluid flows through chamber 399. In chamber 399, the working fluid encounters heat exchanger 502. As generally shown by arrow DD, the working fluid flows through heat exchanger 502 which cools the working fluid. One non-limiting example of a heat exchanger is set forth in U.S. Pat. No. 6,422,020, which is incorporated herein by reference. However, other types of heat exchanges whether being located within the engine or external to the engine are contemplated herein.

From heat exchanger 502 the cooled compressed working fluid flows through opening 397 into chamber 398 generally as indicated by arrow E. A portion of the cooled compressed working fluid flows from chamber 398 through the static preswirl nozzle 396 to the gas turbine engine blades 362. This working fluid flows between the preswirl mini disk 364 and the turbine disk 360 generally as is indicated by arrow G. The working fluid then enters through opening 395 and passes into the blade 362 to provide convective heat transfer cooling of the component.

Another portion of the cooled compressed working fluid in chamber 398 flows through opening 390 generally in the direction indicated by arrow H and enters chamber 344. From chamber 344 the cooled compressed working fluid is pressurized by pump 346 and passes into chamber 350 generally as is indicated by arrow I. From chamber 350 the cooled compressed working fluid flows through opening 352 generally as indicated by arrow K into chamber 354. From chamber 354 the working fluid flows through opening 356 generally as indicated by arrow L to enter the combustor discharge nozzle 334. In another embodiment, a static vaned diffuser is incorporated in place of openings 352 to introduce the cooling air into chamber 354 and to the base of the combustor discharge nozzles 336.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a compressor operable to increase the pressure of a working fluid;
   a combustor in flow communication with at least a portion of the working fluid from said compressor, said combustor discharging a hot exhaust gas flow therefrom;
   a turbine including a rotatable structure with a plurality of turbine blades disposed in flow communication with the hot exhaust gas flow from said combustor, said rotatable structure includes a turbine disk and a preswirl mini-disk coupled thereto;
   a mechanical housing surrounding at least a portion of the gas turbine engine; and
   a pump connected to said preswirl mini-disk and located within said mechanical housing to increase the pressure of a flow of component cooling working fluid from said compressor, said pump having an inlet in flow communication with the flow of component cooling working fluid from said compressor and an outlet in fluid flow communication with an engine component to be cooled, said pump rotates with said rotatable structure to increase the pressure of the component cooling working fluid passed through said outlet.

2. The gas turbine engine of claim 1, wherein said compressor has a compressor discharge, and wherein the flow of component cooling working fluid passed through said compressor discharge.

3. The gas turbine engine of claim 1, wherein said pump and said preswirl mini-disk are formed as a unitary component.

4. An apparatus comprising:
   a gas turbine engine having a compressor portion operable to compress a working fluid, a combustor portion in flow communication with the compressor, and a turbine portion including a rotatable turbine structure in flow communication with said combustor portion, said rotatable turbine structure includes a rotatable turbine disk and a mini preswirl disk connected thereto, a first portion of the working fluid being flowed from said compressor portion to cool an engine component; and
   a pump connected to said mini preswirl disk and rotatable with said turbine structure to pressurize said first portion of working fluid flowed from the compressor portion to cool the engine component.

5. The apparatus of claim 4, wherein the pump and the turbine structure comprise a unitary piece.

6. The apparatus of claim 4, wherein said gas turbine engine includes a mechanical housing, and wherein at least said rotatable turbine structure and said pump are located within said mechanical housing.

7. The apparatus of claim 4, which further includes a heat exchanger in flow communication with the first portion of working fluid, said heat exchanger operable to cool the first portion of working fluid prior to said pump pressurizing the first portion of working fluid.

8. A system for cooling a gas turbine engine comprising:
a compressor for pressurizing a working fluid within the gas turbine engine;
a rotatable turbine disk including a fluid pressurizer having a fluid intake and a fluid output, said fluid pressurizer is rotatable with the turbine disk, said turbine disk including a plurality of blades;
a fluid pathway extending between said compressor and said fluid intake for the passage of working fluid;
a second fluid pathway extending along said turbine disk for the passage of working fluid from said compressor to said plurality of blades absent passage through said fluid pressurizer;
a preswirl nozzle disposed in flow communication with said second fluid flow pathway; and
wherein the fluid pressurizer upon rotation with said turbine structure is effective to increase the pressure of the working fluid passed through said fluid output relative to the pressure of the fluid passed through said fluid intake.

9. The system of claim 8, wherein the pressurizer is coupled to the turbine structure.

10. The system of claim 8, which further includes a mechanical housing, and wherein the turbine disk is located within said mechanical housing.

11. The system of claim 8, which further includes a member coupled to and rotatable with said turbine disk, and wherein said pressurizer and said member comprise a unitary piece.

12. A method comprising:
(a) compressing a working fluid within a gas turbine engine compressor;
(b) flowing a portion of the working fluid from the compressor to a rotatable turbine disk including a pump coupled to a preswirl mini disk connected to the turbine disk;
(c) rotating the pump to increase the pressure of the working fluid from said flowing; and
(d) flowing the working fluid from the pump to an engine component to be cooled.

13. The method of claim 12, wherein in said flowing the working fluid is delivered to a portion of the combustor discharge nozzle.

14. The method of claim 12, wherein said rotating is caused by the rotation of the rotatable turbine disk.

15. The method of claim 12, which further comprises cooling the working fluid prior to increasing the pressure in said rotating.

16. The method of claim 12, which further includes providing a gas turbine engine having a mechanical housing, and wherein each of said acts (a)–(d) occurring with the mechanical housing.

17. The method of claim 12, which further includes passing working fluid between the preswirl mini disk and the turbine disk.

18. The method of claim 12, wherein the rotatable turbine disk includes a plurality of turbine blades;
which further includes passing working fluid between the preswirl mini disk and the turbine disk that has not been through said rotating; and
passing the working fluid to the plurality of turbine blades.

* * * * *